(12) United States Patent
Akimoto (10) Patent No.: US 7,532,279 B2
(45) Date of Patent: May 12, 2009

(54) REFLECTIVE LCD DEVICE HAVING A METAL FILM OUTSIDE PIXEL REGION WHICH INCLUDES A LIGHT SHIELDING ELECTRODE AND COMMON ELECTRODE CONTACTING INTERIOR OF SUBSTRATE SEAL PORTION

(75) Inventor: Osamu Akimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 310 days.

(21) Appl. No.: 11/085,356

(22) Filed: Mar. 22, 2005

(65) Prior Publication Data
US 2005/0213000 A1 Sep. 29, 2005

(30) Foreign Application Priority Data
Mar. 23, 2004 (JP) ............... P2004-084297

(51) Int. Cl.
G02F 1/1335 (2006.01)
(52) U.S. Cl. .................. 349/113; 349/111; 349/153
(58) Field of Classification Search ............ 349/153, 349/113, 111
See application file for complete search history.

(56) References Cited

U.S. PATENT DOCUMENTS 6,373,547 B2 * 4/2002 Saito et al. ............... 349/155

2003/0112387 A1 * 6/2003 Lim ...................... 349/110
2003/0137621 A1 * 7/2003 Zhang et al. ............. 349/106
2003/0137624 A1 * 7/2003 Kang et al. .............. 349/113

FOREIGN PATENT DOCUMENTS

JP 2000-171805 6/2000
JP 2001-100187 4/2001

OTHER PUBLICATIONS

Japanese Office Action issued on Jan. 23, 2007.

* cited by examiner

*Primary Examiner*—David Nelms
*Assistant Examiner*—John Heyman
(74) *Attorney, Agent, or Firm*—Sonnenschein Nath & Rosenthal LLP (57) ABSTRACT

A reflective liquid crystal display device and a liquid crystal display unit capable of achieving high moisture resistance and securing long-term reliability through specifically preventing electrode corrosion in a surface portion of a pixel electrode substrate are provided. A seal portion bonds a pixel electrode substrate and a transparent electrode substrate together with a predetermined spacing in between. In this case, the pixel electrodes and a metal film are formed inside an outer surface of the seal portion on the pixel electrode substrate. Thereby, the pixel electrodes and the metal film are not exposed to air, and the moisture resistance can be secured, and electrode corrosion can be prevented. Moreover, as an adhesive surface of the seal portion is a substrate surface, compared to the case where peripheral end surfaces of the whole device are coated, sufficient adhesion can be secured for a long term.

10 Claims, 10 Drawing Sheets

FIG. 1

RELATED ART

FIG. 2

RELATED ART

REFLECTIVE LCD DEVICE HAVING A METAL FILM OUTSIDE PIXEL REGION WHICH INCLUDES A LIGHT SHIELDING ELECTRODE AND COMMON ELECTRODE CONTACTING INTERIOR OF SUBSTRATE SEAL PORTION

CROSS REFERENCES TO RELATED APPLICATIONS

The present invention contains subject matter related to Japanese Patent Application JP 2004-084297 filed in the Japanese Patent Office on Mar. 23, 2004, the entire contents of which being incorporated herein by reference.

BACKGROUND OF THE INVENTION

1. Field of the Invention

The present invention relates to a reflective liquid crystal display device which comprises a reflective pixel electrode, and a liquid crystal display unit which displays an image through the use of the reflective liquid crystal display device such as a reflective liquid crystal projector.

2. Description of the Related Art

In recent years, improvements in definition, downsizing and contrast of projection displays have been rapidly progressed, thereby demands for display devices used for the projection displays have been increased. However, transmissive liquid crystal display devices which are mainly used at present cannot meet the demands. Therefore, attention has been given to a reflective liquid crystal display device as a display device which satisfies the demands, and specifically a liquid crystal display device LCOS (Liquid Crystal On Silicon) which use silicon (Si) as a drive device holds the most promise.

In the transmissive liquid crystal display device, a transparent pixel electrode substrate having a drive circuit which uses, for example, a thin-film transistor (TFT) and a transparent facing substrate having a transparent electrode faces each other, and a liquid crystal is sandwiched therebetween. In the transmissive liquid crystal display device, the liquid crystal is driven by an electric field between facing electrodes. Thereby, light passing through the liquid crystal is modulated to display an image. However, when the drive circuit is irradiated with light, photoelectric conversion occurs in the circuit, thereby an abnormal action occurs, so a top portion of the circuit is prevented from being directly irradiated with light. Therefore, an area where light passes through a pixel region is reduced, and light utilization efficiency declines. In particular, in the case where improvements in downsizing and definition progress, while a pixel size is reduced, the size of the drive device is not changed, so the area where light can pass through is further reduced, thereby the transmissive liquid crystal display device has a limitation of light utilization efficiency.

Figure 1:
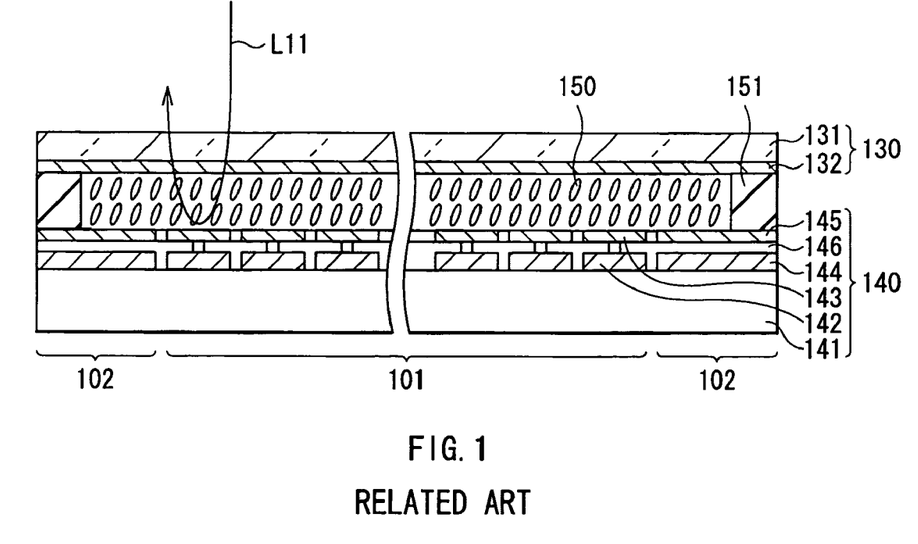
FIG. 1 is a sectional view of the whole structure of a reflective liquid crystal display device of the related art.
Figure 2:
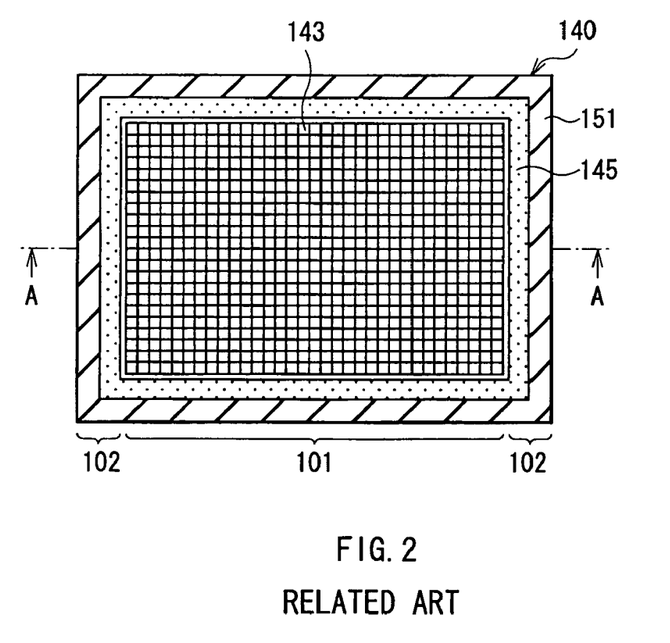
FIG. 2 is a plan view of the whole structure of the reflective liquid crystal display device of the related art.

The structure of a reflective liquid crystal display device using, for example, a silicon drive device substrate as a pixel electrode substrate is shown in FIGS. 1 and 2. FIG. 2 mainly shows a plan view of the pixel electrode substrate. FIG. 1 corresponds to a sectional view taken along a line A-A of FIG. 2.

The reflective liquid crystal display device comprises a pair of transparent electrode substrate 130 and a pixel electrode substrate 140 which face each other, and a liquid crystal 150 injected between the substrates 130 and 140. The transparent electrode substrate 130 includes a glass substrate 131 and a transparent electrode 132 which is laminated on a surface of the glass substrate 131. The pixel electrode substrate 140 includes a silicon substrate 141. On a surface of the silicon substrate 141, in a pixel region 101, a drive circuit 142 and a reflective pixel electrode 143 are laminated in order with an interlayer insulating film 146 in between. Moreover, in a peripheral region 102, a drive circuit (driver circuit) 144 and a light-shielding electrode 145 for preventing the entry of light into the drive circuit 144 are laminated in order with the interlayer insulating film 146 in between. The reflective pixel electrode 143 has functions of driving the liquid crystal 151 and reflecting light. In addition, the number of electrode layer is not limited to one. The transparent electrode substrate 130 and the pixel electrode substrate 140 are bonded together by a seal material 150 applied to the peripheral region 102. In the reflective liquid crystal display device, the liquid crystal 150 is driven by an electric field between the transparent electrode 132 and the reflective pixel electrode 143 which face each other. Thereby, light L11 passing through a liquid crystal layer is modulated to display an image.

As shown in the drawings, in the reflective liquid crystal display device, the drive circuit 142 can be disposed on the back side of each pixel electrode 143, and the pixel electrode 143 shields the drive circuit 142 from light, so there is not necessary to provide a light-shielding area in the pixel region 101, thereby unlike the transmissive liquid crystal display device, a decline in the light utilization efficiency will not occur. Moreover, as the silicon drive device is used as a drive device, transistor characteristics (such as, for example, driving capability and variations between devices) can be higher than the TFT, and a high-speed drive circuit which is necessary to improve the definition can be formed, so compared to the transmissive liquid crystal display device, specifically the reflective liquid crystal display device has advantages in definition and downsizing.

A publicly known document about the structure of a liquid crystal display device is Japanese Unexamined Patent Application Publication No. 2001-281677. In the document, a seal structure between facing substrates in a transmissive liquid crystal display device is described. As described in the document, in the transmissive liquid crystal display device, a seal material is applied to a peripheral portion of the substrates to bond them together. The seal structure of a reflective liquid crystal display device is basically the same as that of the transmissive liquid crystal display device. In this case, a special process such as removing an electrode is not carried out on a portion where the seal material is applied, and for example, as can be seen from the structure shown in FIG. 1, the reflective liquid crystal display device has a structure in which the seal material 151 is disposed on the reflective pixel electrode 143 in cross section in a thickness direction.

SUMMARY OF THE INVENTION

A display device used in a projection display works in a high-temperature environment, because light is condensed in the display device, so compared to a direct-view-type display, in the display device, high weather resistance may be required. In particular, in the reflective liquid crystal display device, an aluminum-based metal material which is generally used in an LSI (Large Scale Integrated circuit) is used as the reflective pixel electrode 143, so the electrode 143 is corroded by atmospheric moisture under such a high temperature, and long-term reliability of the device declines. The light-shielding electrode 145 is generally formed of the same material as that of the reflective pixel electrode 143 in terms of a manufacturing process, so electrode corrosion occurs. In addition, the transparent electrode 132 is generally made of ITO (Indium Tin Oxide), so the electrode corrosion is a big issue in the pixel electrode substrate 140. Moreover, in the transmissive liquid crystal display device, ITO is generally used in the pixel electrode substrate, so the corrosion is an issue specific to the reflective liquid crystal display device using the reflective pixel electrode 143 made of a metal material.

Figure 3:
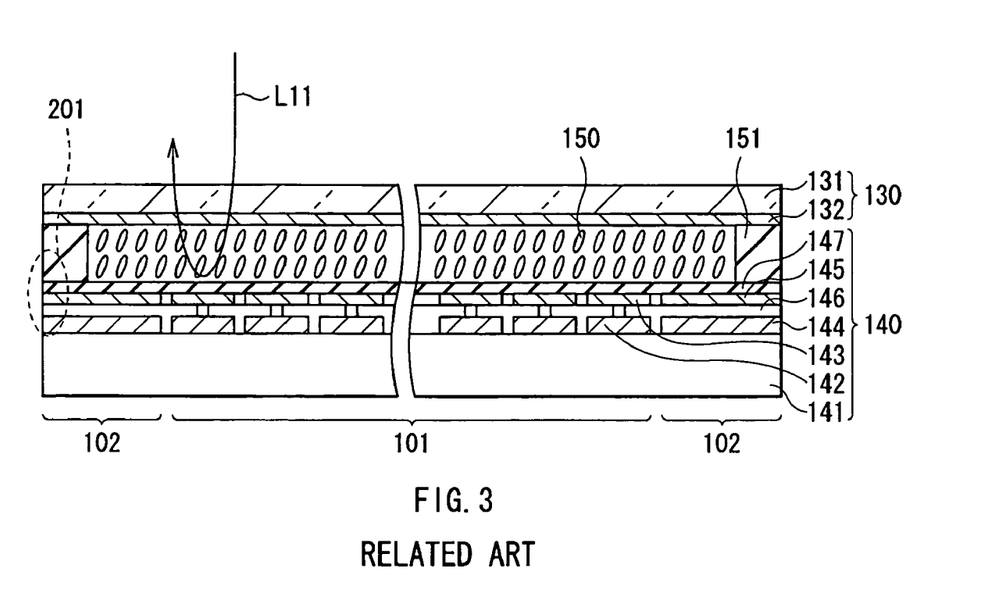
FIG. 3 is a sectional view of a first structure example of a reflective liquid crystal display device with improved moisture resistance of the related art.

Therefore, in the reflective liquid crystal display device, techniques for improving moisture resistance have been achieved. FIG. 3 shows a first structure example of a reflective liquid crystal display device with improved moisture resistance of the related art. In the structure example, moisture resistance is improved through coating the whole surfaces of the reflective pixel electrode 143 and the light-shielding electrode 145 with an inorganic protective film 147. The inorganic protective film 147 is made of, for example, silicon nitride. Also, the LSI is coated with the same inorganic protective film 147, and in this case, in general, the surfaces of all electrodes are coated with the inorganic protective film 147, and in order to obtain sufficient moisture resistance, the inorganic protective film 147 may be required to have a thickness of approximately 0.5 μm or more.

However, in the reflective liquid crystal display device, when the inorganic protective film 147 is used in the pixel region 101, the inorganic protective film 147 becomes a capacity component between the transparent electrode 132 and the reflective pixel electrode 143, thereby an electric field applied to the liquid crystal 150 is reduced. In particular, in the case where a liquid crystal layer is thin, for example, approximately 3 μm or less, the effect will be increased. When the pixel region 101 is not coated with the inorganic protective film 147, and the inorganic protective film 147 is formed only in the peripheral region 102 in order to prevent the effect, there is no protective film on the reflective pixel electrode 143, so when the reflective pixel electrode 143 is exposed to air in a manufacturing process after forming the reflective pixel electrode 143, the surface of the reflective pixel electrode 143 is oxidized, thereby the reflectivity of the reflective pixel electrode 143 declines. Moreover, coating the surface of the electrode 143 with the protective film is not enough, because moisture may enter from an end portion 201 around the substrate.

Moreover, in the reflective liquid crystal display device, a terminal (a common electrode) for supplying power to the transparent electrode 132 is provided, and in the case where the common electrode is formed on the pixel electrode substrate 140, it is necessary to remove the inorganic protective film in a portion where the common electrode is formed, so the moisture resistance may not be secured.

Figure 4:
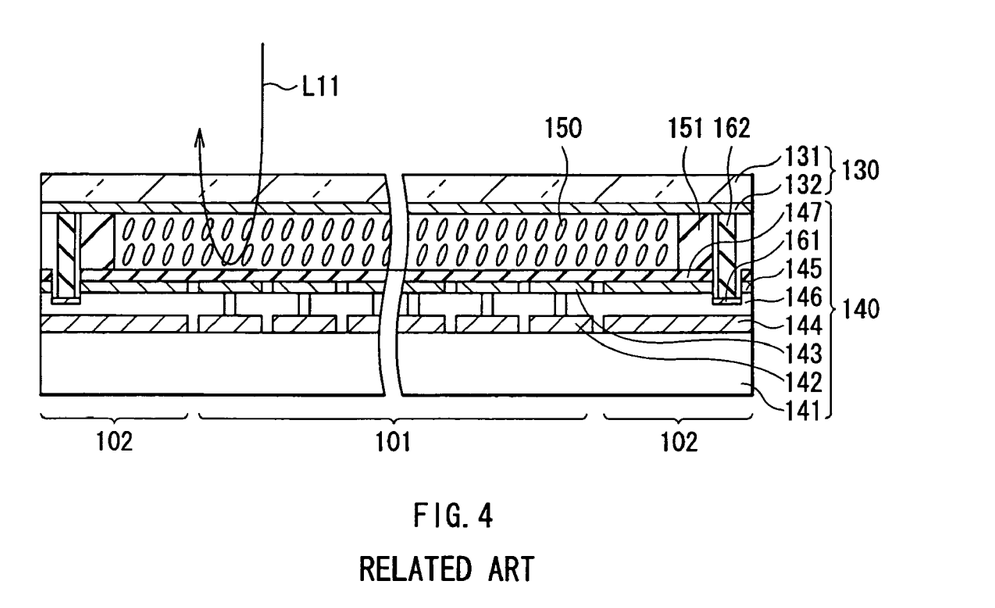
FIG. 4 is a sectional view of a structure of the related art of a reflective liquid crystal display device in which a common electrode is disposed on a pixel electrode substrate.
Figure 5A:
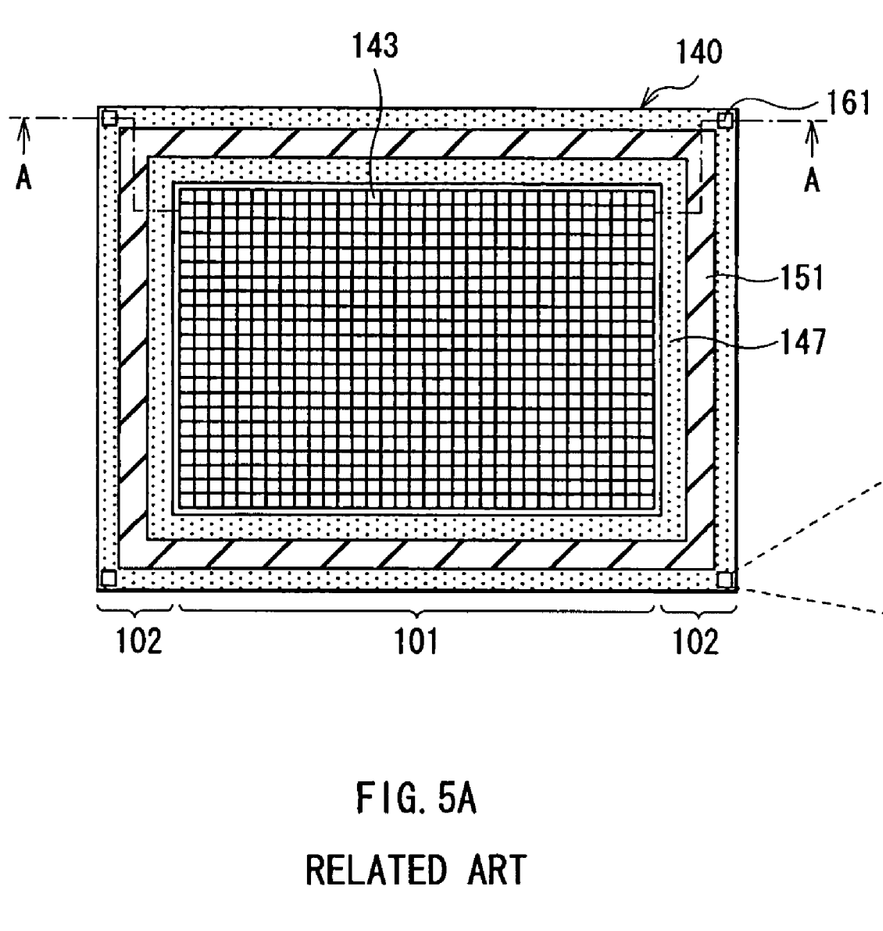
FIGS. 5A and 5B are plan views of the structure of the related art of the reflective liquid crystal display device in which the common electrode is disposed on the pixel electrode substrate.
Figure 5B:
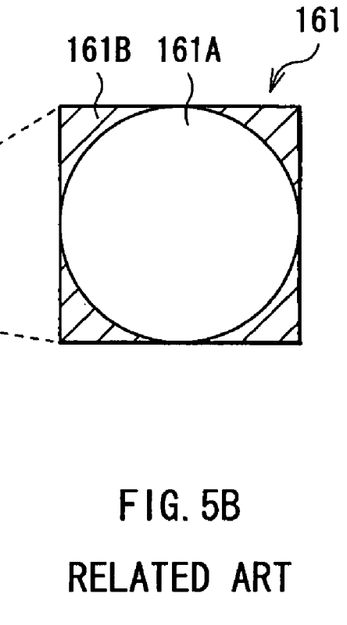

FIGS. 4 and 5A show the structure of a reflective liquid crystal display device with improved moisture resistance of the related art in the case where a common electrode 161 is disposed on the pixel electrode substrate 140. FIG. 5A mainly shows a plan view of the pixel electrode substrate 140. FIG. 4 corresponds to a sectional view taken along a line A-A of FIG. 5A. FIG. 5B shows an enlarged view of the common electrode 161.

While the common electrode 161 is conducted to the transparent electrode 132 by the common material 162 as shown in FIG. 4, the common electrode 161 is formed in a region where a top layer of the pixel electrode substrate 140 is removed so as not to be conducted to other electrodes in the pixel electrode substrate 140. Moreover, the common electrode 161 has a different shape from that of the reflective pixel electrode 143, and thereby a different electric field is applied to the common electrode 161, so the orientation characteristic of the liquid crystal 150 is affected. Therefore, as shown in FIG. 5A, the common electrode 161 is disposed in a position away from the pixel region 101. Therefore, the common electrode 161 is formed outside the seal material 151. In FIG. 5A, the common electrode 161 is disposed in each of four corners; however, the number of the common electrodes 161 may be less than four.

In order to form the common electrode 161 as described above, it is necessary to remove the inorganic protective film 147. In this case, when the whole surface of the common electrode 161 is coated with the common material 162, the moisture resistance of the common electrode 161 can be secured. However, in consideration of contact with peripheral electrodes by the common material 162, it is difficult to sufficiently coat the whole surface of the common electrode 161 with the common material 162. In other words, as shown in FIG. 5B, although a central portion 161A of the common electrode 161 is sufficiently coated with the common material 162, a peripheral portion 161B is not coated with the common material 162. In the structure of the related art, the common electrode 161 is formed outside the seal material 151, so a portion of the common electrode 161 which is not coated with the common material 162 may be corroded.

Figure 6:
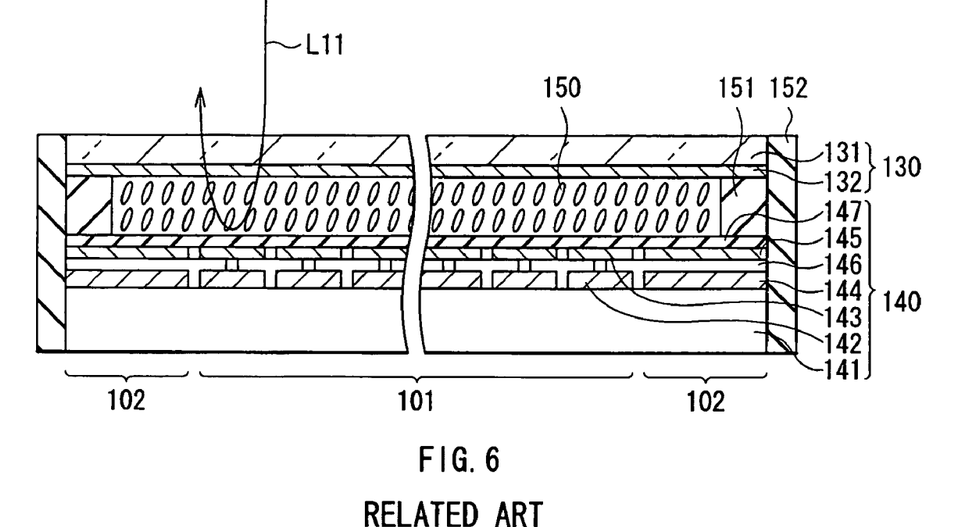
FIG. 6 is a sectional view of a second structure example of a reflective liquid crystal display device with improved moisture resistance of the related art.
Figure 7:
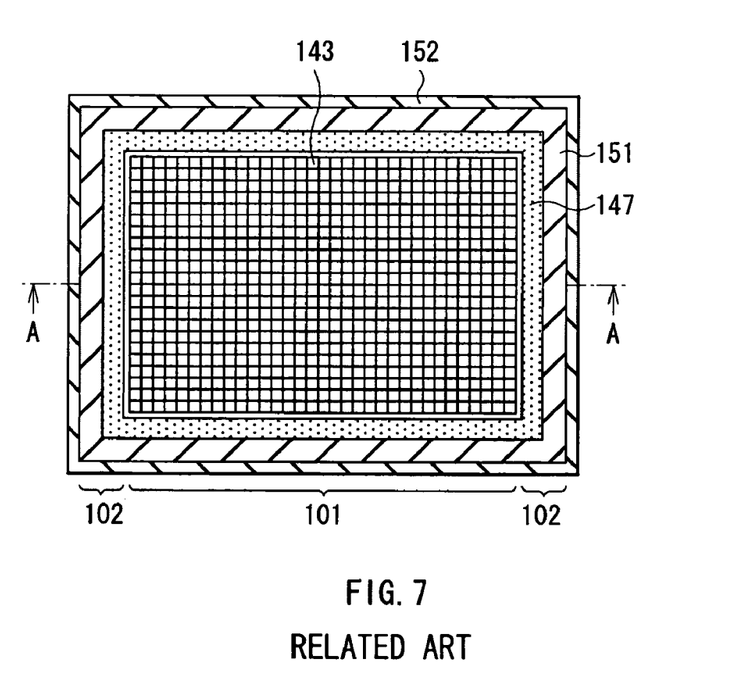
FIG. 7 is a plan view of the second structure example of the reflective liquid crystal display device with improved moisture resistance of the related art.

Compared to the moisture-resistant structure of the inorganic protective film 147, a second structure example of a reflective liquid crystal display device with further improved moisture resistance of the related art is shown in FIGS. 6 and 7. In the structure, the whole peripheral end surface of the device is coated with a coating material 152 with high moisture resistance so as to improve the moisture resistance. In the first structure example shown in FIG. 3, there is a moisture entry opening in the end portion 201. In the second structure example, it looks as if the moisture entry opening is prevented. However, in reality, due to a very thin shape of the end surface of the display device which is in contact with the coating material 152 and stains on the end surface, adhesion to the coating material 152 is insufficient, so it is difficult to secure the moisture resistance at the time of a long-term operation.

As described above, in the reflective liquid crystal display device, higher moisture resistance is necessary in the pixel electrode substrate 140, so techniques of having higher moisture resistance than before are used in the reflective liquid crystal display device. However, the moisture-resistant structure of the related art is insufficient, so a further improvement in the moisture resistance is desired.

In view of the foregoing, it is desirable to provide a reflective liquid crystal display device and a liquid crystal display unit capable of achieving higher moisture resistance, and specifically securing long-term reliability through preventing electrode corrosion in a surface portion of a pixel electrode substrate.

A reflective liquid crystal display device according to an embodiment of the invention includes: a pixel electrode substrate including reflective pixel electrodes disposed in matrix and a metal film formed outside a pixel region where the pixel electrodes are disposed; a transparent electrode substrate including a transparent electrode and facing the pixel electrode substrate with a predetermined spacing in between; a seal portion bonding the pixel electrode substrate and the transparent electrode substrate together with a predetermined spacing between facing substrate surfaces; and a liquid crystal sealed between the pixel electrode substrate and the transparent electrode substrate, wherein the pixel electrodes and the metal film are formed inside an outer surface of the seal portion on the pixel electrode substrate.

In the reflective liquid crystal display device according to an embodiment of the invention, the metal film may be partially coated with an end surface of the seal portion. One kind or a plurality of kinds of metal films may be formed on the pixel electrode substrate. The metal film includes, for example, a common electrode for applying a voltage to a light-shielding electrode or the transparent electrode.

A liquid crystal display unit according to an embodiment of the invention displays an image through using light modulated by the reflective liquid crystal display device according to an embodiment of the invention.

In the reflective liquid crystal display device and the liquid crystal display unit according to an embodiment of the invention, on the pixel electrode substrate, the pixel electrodes and the metal film are formed inside the outer surface of the seal portion. Thereby, the pixel electrodes and the metal film are not exposed to air, and moisture resistance can be secured, and electrode corrosion can be prevented. Moreover, as an adhesive surface of the seal portion is a substrate surface, compared to the case where peripheral end surfaces of the whole device are coated, sufficient adhesion can be secured for a long term. Therefore, in the case where weather resistance is required as in the case of a projection display, high moisture resistance can be secured for a long term, and electrode corrosion in a surface portion of the pixel electrode substrate can be prevented, thereby long-term reliability can be secured.

In the reflective liquid crystal display device according to an embodiment of the invention, the pixel electrodes and the metal film can be coated with, for example, an inorganic protective film. In the case where the pixel electrodes are coated with the inorganic protective film, the inorganic protective film becomes a capacity component between the transparent electrode and the reflective pixel electrode, thereby an electric field applied to the liquid crystal may be reduced. In particular, in the case where a liquid crystal layer is thin, for example, as thin as approximately 3 µm or less, the effect of the inorganic protective film will be increased. However, in the reflective liquid crystal display device according to an embodiment of the invention, after sealing, the moisture resistance can be sufficiently secured by the seal portion, so the protective film may have the minimum thickness necessary for a manufacturing process (for example, 0.5 µm or less). Therefore, in the reflective liquid crystal display device according to an embodiment of the invention, in the case where a spacing between the pixel electrode substrate and the transparent electrode substrate is 3 µm or less, while the capacity component is minimized, the surfaces of the pixel electrodes can be coated with the inorganic protective film.

In the reflective liquid crystal display device and the liquid crystal display unit according to an embodiment of the invention, on the pixel electrode substrate, the pixel electrodes and the metal film are formed inside the outer surface of the seal portion, so the pixel electrodes and the metal film are not exposed to air, and sufficient moisture resistance can be secured. Further, as an adhesive surface of the seal portion is a substrate surface, so compared to the case where peripheral end surfaces of the whole device are coated, sufficient adhesion can be secured for a long term. Therefore, in the case where weather resistance is required as in the case of a projection display, high moisture resistance can be secured for a long term, and in particular, electrode corrosion in a surface portion of the pixel electrode substrate can be prevented, and long-term reliability can be secured.

In particular, as the liquid crystal display unit according to an embodiment of the invention displays an image through using the reflective liquid crystal display device according to an embodiment of the invention, an image can be displayed for a long term in good condition.

Other and further objects, features and advantages of the invention will appear more fully from the following description.

DETAILED DESCRIPTION OF THE PREFERRED EMBODIMENTS

Preferred embodiments of the present invention will be described in more detail below referring to the accompanying drawings.

First Embodiment

<Description of Reflective Liquid Crystal Display Device>

Figure 8:
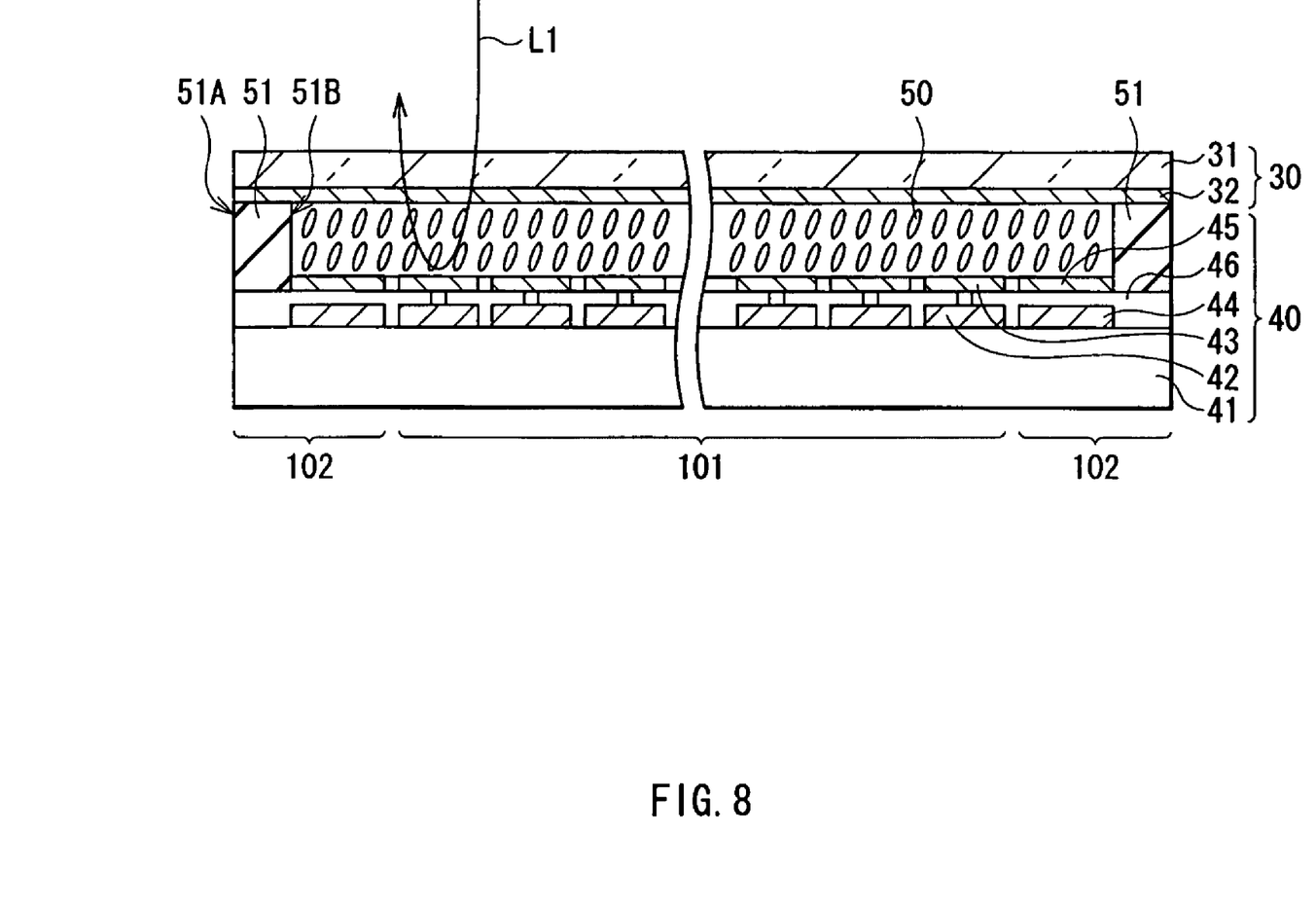
FIG. 8 is a sectional view of the whole structure of a reflective liquid crystal display device according to a first embodiment of the invention.
Figure 9:
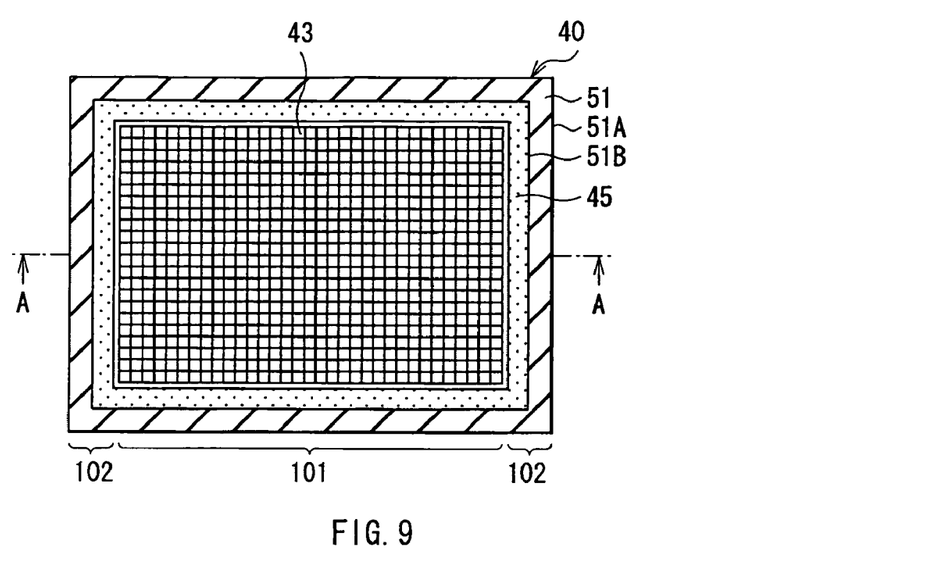
FIG. 9 is a plan view of the whole structure of the reflective liquid crystal display device according to the first embodiment of the invention.

FIG. 8 shows the whole structure of a reflective liquid crystal display device according to a first embodiment of the invention. FIG. 9 shows a plan view of the reflective liquid crystal display device. FIG. 8 corresponds to a sectional view taken along a line A-A of FIG. 9. The reflective liquid crystal display device includes a pair of a transparent electrode substrate 30 and a pixel electrode substrate 40 which face each other and a liquid crystal 50 injected between the substrates 30 and 40. In FIG. 9, the transparent electrode substrate 30 is not shown. The transparent electrode substrate 30 and the pixel electrode substrate 40 are bonded together with a predetermined spacing therebetween by a seal portion 51. As the liquid crystal 50, for example, a vertically aligned liquid crystal can be used.

The transparent electrode substrate 30 includes a glass substrate 31, and a transparent electrode 32 which are laminated on a surface of the glass substrate 31 in contact with the liquid crystal 50 (a surface facing the pixel electrode substrate 40). Further, an alignment film may be laminated all over a portion of the transparent electrode substrate 30 which is in contact with the liquid crystal 50, although it is not shown. As the transparent electrode 32, an electrode material with a function of transmitting light, generally ITO (Indium Tin Oxide) which is a solid solution material of tin oxide ($SnO_2$) and indium oxide ($In_2O_3$) is used. A common potential (for example, a ground potential) is applied to the transparent electrode 32 in the whole pixel region through a common electrode.

Figure 10:
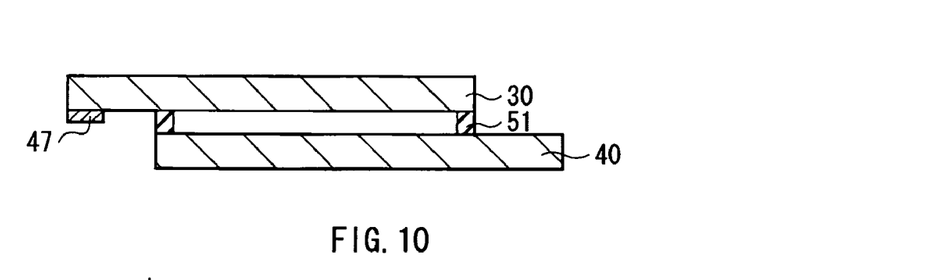
FIG. 10 is an illustration of a structure example in the case where a common electrode is disposed on a transparent electrode substrate.

FIG. 10 shows an example of a method of supplying a potential to the transparent electrode 32. As shown in FIG. 10, for example, when the transparent electrode substrate 30 and the pixel electrode substrate 40 are bonded together, an end of the transparent electrode substrate 30 is disposed outside the seal portion 51, and a common electrode 47 is formed on an outside part of the seal portion 51. A potential is applied to the transparent electrode 32 through the common electrode 47.

The pixel electrode substrate 40 includes, for example, a single-crystal silicon substrate 41. A drive circuit 42 and a reflective pixel electrode 43 are laminated in order with an interlayer insulating film 46 in between on a surface of the silicon substrate 41 in a pixel region 101. Moreover, a drive circuit (driver circuit) 44 and a light-shielding electrode 45 for preventing the entry of light into the drive circuit 44 are laminated in order with the interlayer insulating film 46 in between in a peripheral region 102. Further, an alignment film may be laminated all over a portion of the pixel electrode substrate 40 which is in contact with the liquid crystal 50, although it is not shown. As the alignment film, for example, an evaporated film made of polyimide or silicon oxide can be used; however, the embodiment is not specifically limited to this case. In the embodiment, "light-shielding electrode 45" corresponds to a specific example of "metal film" in the invention.

A plurality of the pixel electrodes 43 are formed in matrix on the pixel region 101. The pixel electrodes 43 are made of, for example, an aluminum-based metal material used for an LSI. The pixel electrodes 43 have a function as a light reflective film and a function as an electrode which applies a voltage to the liquid crystal 50. The number of electrode layers is not limited to one.

The drive circuit 42 is disposed on the back side of each pixel electrode 43 corresponding to each pixel electrode 43, and a plurality of the drive circuits 42 are formed in matrix in the pixel region 101. The drive circuits 42 are active drive circuits using a MOS (Metal Oxide Semiconductor) type semiconductor circuit. The drive circuits 42 are disposed on the back side of each pixel electrode 43 so as to prevent the entry of light. The drive circuit 44 disposed on the peripheral region 101 is a peripheral circuit for controlling the drive circuits 42 such as a data driver or a scan driver.

In the reflective liquid crystal display device, the transparent electrode substrate 30 and the pixel electrode substrate 40 are bonded together by a seal material applied to the peripheral region 102. In this case, the transparent electrode substrate 30 and the pixel electrode substrate 40 are bonded together so that the pixel electrodes 43 and the light-shielding electrode 45 on the pixel electrode substrate 40 are disposed inside the seal portion 51. When a portion of the light-shielding electrode 45 where the seal material is applied is removed beforehand or when the light-shielding electrode 45 is not formed in a portion where the seal material is applied in a step of laminating the light-shielding electrode 45, the pixel electrodes 43 and the light-shielding electrode 45 can be disposed inside the seal portion 51. Further, when the light-shielding electrode 45 is removed in the peripheral region 102, a portion where the light-shielding electrode 45 is removed is not shielded from light, so it is preferable that the drive circuit 44 is also formed inside the seal portion 51 together with the light-shielding electrode 45. Further, another layer disposed between the light-shielding electrode 45 and the drive circuit 44 may have a function of shielding light, or the transparent electrode substrate 30 or an illumination optical system (not shown) may have a function of shielding light to prevent the entry of light into the drive circuit 44.

Figure 11:
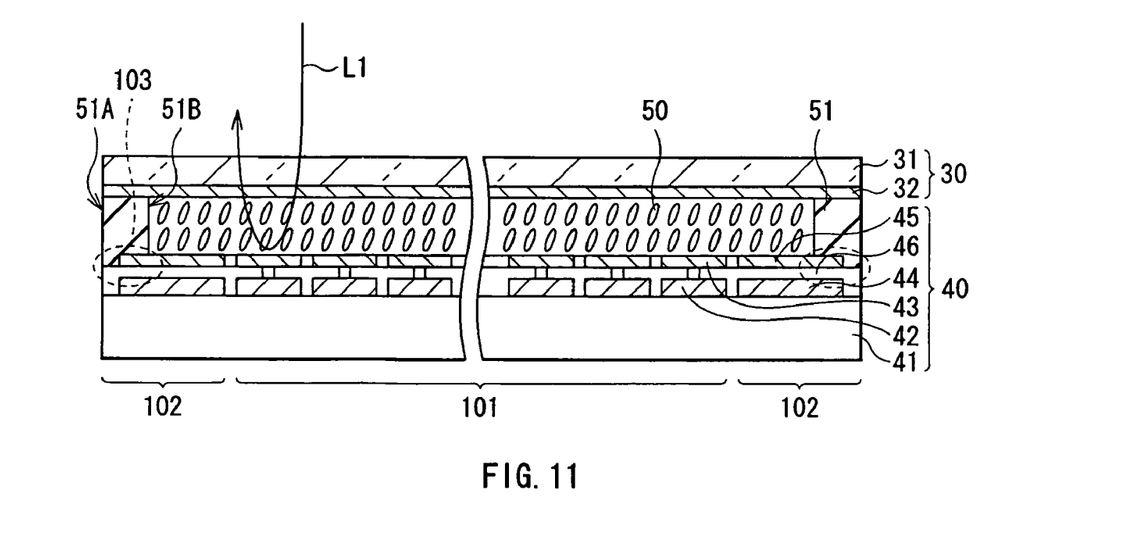
FIG. 11 is a sectional view of another structure example of the reflective liquid crystal display device according to the first embodiment of the invention.

In the structure example of FIG. 8, all of the pixel electrodes 43 and the light-shielding electrode 45 are formed inside an inner surface 51B of the seal portion 51; however, as shown in FIG. 11, the light-shielding electrode 45 may be partially coated with an end surface 103 of the seal portion 51. In this case, a region where the light-shielding electrode 45 is removed can be minimized, so compared to the structure example shown in FIG. 8, a light-shielding property can be improved. In the case where a part of the light-shielding electrode 45 is coated with the seal portion 51, as the seal portion 51, a seal material with high insulation is preferably used.

In other words, in the seal structure according to the embodiment, the pixel electrodes 43 and the light-shielding electrode 45 are preferably formed at least inside an outer surface 51A of the seal portion 51.

Next, functions and actions of the reflective liquid crystal display device with the above-described structure will be described below.

In the reflective liquid crystal display device, incident light L1 entering from the transparent electrode substrate 30 and passing through the liquid crystal 50 is reflected by a reflection function of the pixel electrodes 43. The light L1 reflected by the pixel electrodes 43 passes through the liquid crystal 50 and the transparent electrode substrate 30 to an opposite direction to a direction where the light is entered so as to be emitted. At this time, the optical characteristics of the liquid crystal 50 are changed according to a potential difference between facing electrodes, thereby the light L1 passing through the liquid crystal 50 is modulated. Therefore, by the light modulation, gray levels can be produced, and modulated light L1 is used for image display.

In the reflective liquid crystal display device, the pixel electrodes 43 and the light-shielding electrode 45 are formed inside the outer surface 51A of the seal portion 51 on the pixel electrode substrate 40, so the pixel electrodes 43 and the light-shielding electrode 45 are not exposed to air, and moisture resistance can be secured and electrode corrosion can be prevented. Moreover, as an adhesive surface of the seal portion 51 is a substrate surface, so compared to the case where peripheral end surfaces of the whole device are coated (refer to FIGS. 6 and 7), sufficient adhesion can be secured for a long term. Therefore, in the case where weather resistance is necessary as in the case of a projection display, high moisture resistance can be secured for a long term, and electrode corrosion in a surface portion of the pixel electrode substrate 40 can be prevented, thereby long-term reliability can be secured.

As described above, in the reflective liquid crystal display device according to the embodiment, high moisture resistance can be achieved, and specifically electrode corrosion in a surface portion of the pixel electrode substrate can be prevented, thereby long-term reliability can be secured.

<Description of Liquid Crystal Display Unit>

Figure 12:
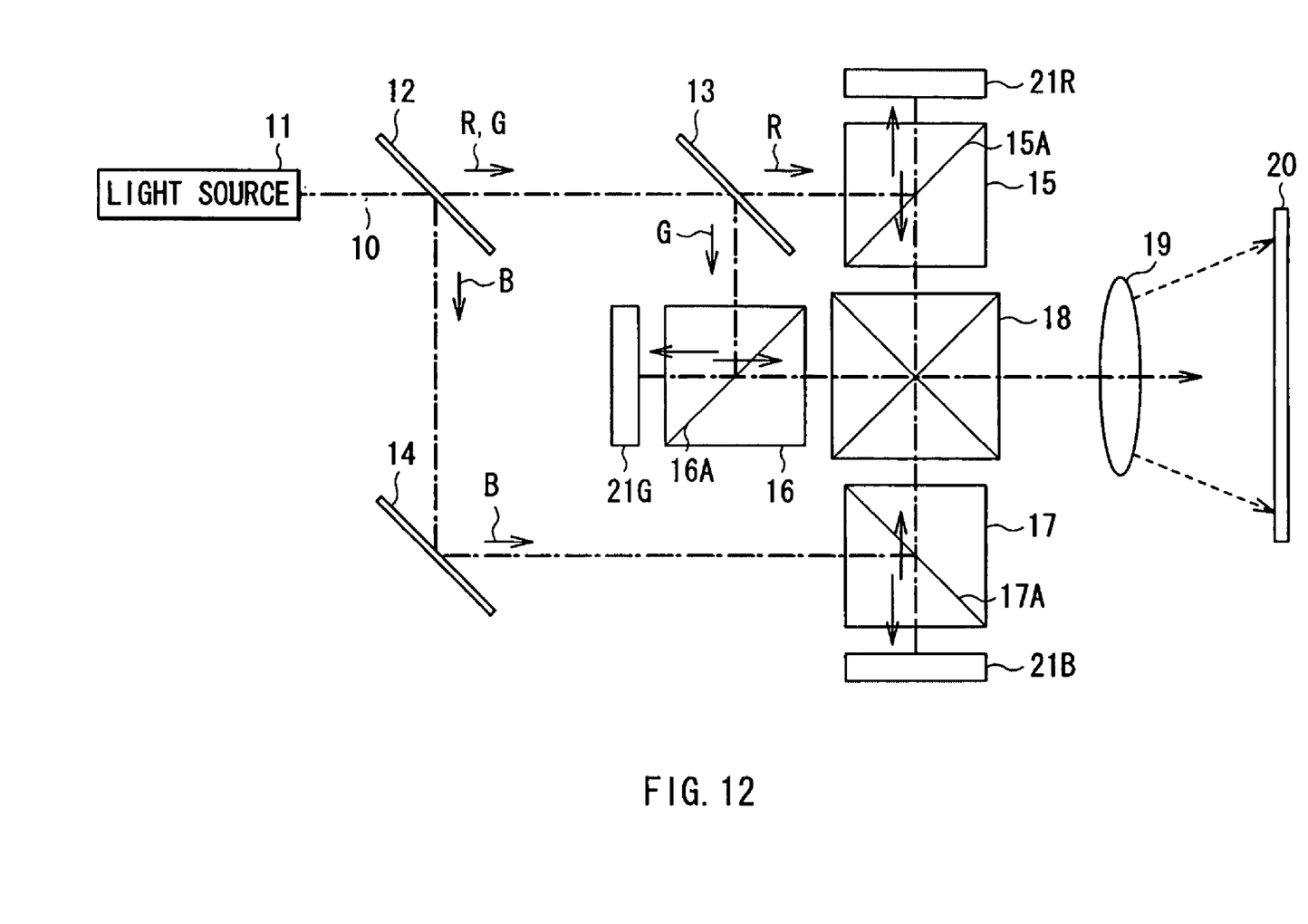
FIG. 12 is an illustration of an example of a liquid crystal display unit using the reflective liquid crystal display device shown in FIG. 8.

Next, an example of a liquid crystal display unit using the reflective liquid display device according to the embodiment will be described below. As shown in FIG. 12, an example of a reflective liquid crystal projector using the reflective liquid crystal display device as a light valve will be described below.

The reflective liquid crystal projector shown in FIG. 12 is a so-called three-panel system using three liquid crystal light valves 21R, 21G and 21B for red, green and blue to display a color image. The reflective liquid crystal projector includes a light source 11, dichroic mirrors 12 and 13 and a total reflection mirror 14 along an optical axis 10. The reflective liquid crystal projector further includes polarizing beam splitters 15, 16 and 17, a synthesizing prism 18, a projection lens 19 and a screen 20.

The light source 11 emits white light including red light (R), blue light (B) and green light (G) which are necessary to display a color image, and as light source 11, for example, a halogen lamp, a metal halide lamp, a xenon lamp or the like is used.

The dichroic mirror 12 has a function of separating light from the light source 11 into blue light and light of other colors. The dichroic mirror 13 has a function of separating light passing through the dichroic mirror 12 into red light and green light. The total reflection mirror 14 reflects the blue light separated by the dichroic mirror 12 toward the polarizing beam splitter 17.

The polarizing beam splitters 15, 16 and 17 are disposed along the optical paths of red light, green light and blue light, respectively. The polarizing beam splitter 15, 16 and 17 have polarization splitting surfaces 15A, 16A and 17A, respectively, and have a function of dividing each incident color light into two polarized components orthogonal to each other on the polarization splitting surfaces 15A, 16A and 17A. The polarization splitting surfaces 15A, 16A and 17A reflect one polarized component (for example, S-polarized component) and pass the other polarized component (for example, P-polarized component) therethrough.

As the liquid crystal light valves 21R, 21G and 21B, the reflective liquid crystal display devices with the above-described structure are used. A predetermined polarized component (for example, S-polarized component) of each color light divided by each of the polarization splitting surfaces 15A, 16A and 17A of the polarizing beam splitters 15, 16 and 17 enters into each of the liquid crystal light valves 21R, 21G and 21B. When the liquid crystal light valves 21R, 21G and 21B are driven by a drive voltage given according to image signals, and the liquid crystal light valves 21R, 21G and 21B have a function of modulating incident light and reflecting the modulated light toward the polarizing beam splitters 15, 16 and 17, respectively.

The synthesizing prism 18 has a function of synthesizing the predetermined polarized component (for example, P-polarized component) of each color light which is emitted from each of liquid crystal light valves 21R, 21G and 21B and passes through each of the polarizing beam splitters 15, 16 and 17. The projection lens 19 has a function as a projection section projecting synthesized light emitted from the synthesizing prism 18 toward the screen 20.

In the reflective liquid crystal projector with the above structure, white light emitted from the light source 11 is separated into blue light and light of other colors (red light and green light) by the function of the dichroic mirror 12. The blue light is reflected toward the polarizing beam splitter 17 by the function of the total reflection mirror 14. The light of other colors is separated into red light and green light by the function of the dichroic mirror 13. The red light and the green light enter into the polarizing beam splitters 15 and 16, respectively.

The polarizing beam splitters 15, 16 and 17 divide each incident color light into two polarized components orthogonal to each other on the polarization splitting surfaces 15A, 16A and 17A, respectively. At this time, the polarization splitting surfaces 15A, 16A and 17A reflect one polarized component (for example, S-polarized component) toward the liquid crystal light valves 21R, 21G and 21B, respectively.

The liquid crystal light valves 21R, 21G and 21B are driven by a drive voltage given according to image signals, and modulate the predetermined polarized component of each color light entered into the liquid crystal light valves 21R, 21G and 21B on a pixel-by-pixel basis. At this time, as the liquid crystal light valves 21R, 21G and 21B, the reflective liquid crystal display devices according to the embodiment are used, so the weather resistance is superior, and sufficient display performance can be maintained for a long term.

The liquid crystal light valves 21R, 21G and 21B reflect each modulated color light toward the polarizing beam splitters 15, 16 and 17, respectively. The polarizing beam splitters 15, 16 and 17 pass only a predetermined polarized component (for example, P-polarized component) among reflected (modulated) light from the liquid crystal light valves 21R, 21G and 21B, respectively, to emit the predetermined polarized component toward the synthesizing prism 18. The synthesizing prism 18 synthesizes the predetermined components of each color light having passed through the polarizing beam splitters 15, 16 and 17 to emit the synthesized light to the projection lens 19. The projection lens 19 projects the synthesized light emitted from the synthesizing prism 18 toward the screen 20. Thereby, an image according to the light modulated by the liquid crystal light valves 21R, 21G and 21B is projected on the screen 20 so as to display a desired image.

As described above, the reflective liquid crystal projector according to the embodiment uses the reflective liquid crystal display devices having a seal structure with superior moisture resistance and superior weather resistance according to the embodiment as the liquid crystal light valves 21R, 21G and 21B, so an image can be displayed for a long term in good condition.

Second Embodiment

A second embodiment relates to a moisture resistant structure in the case where a terminal (common electrode) for supplying powder to the transparent electrode 32 is disposed on a pixel electrode substrate side. In the following description, like components are denoted by like numerals as of the first embodiment and will not be further described.

Figure 13:
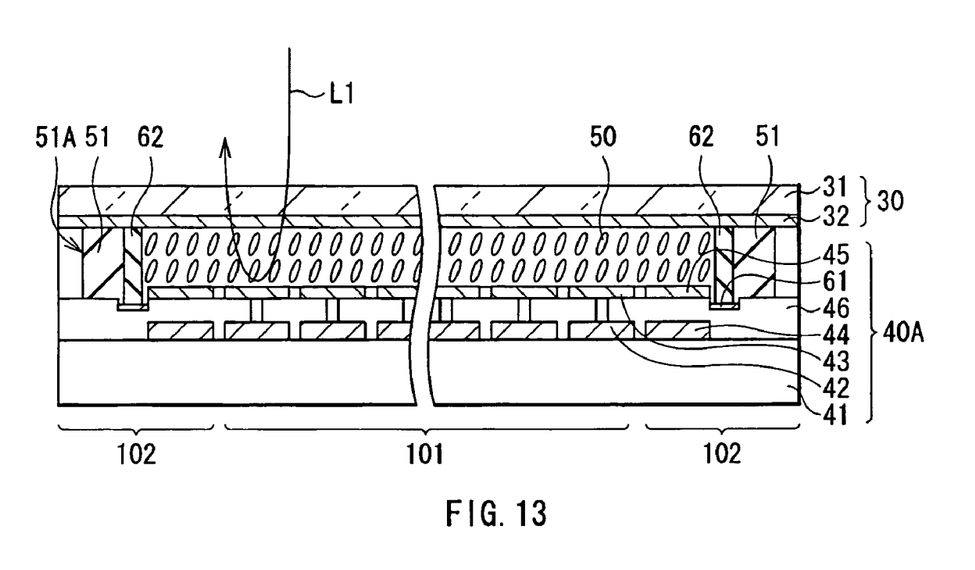
FIG. 13 is a sectional view of the whole structure of a reflective liquid crystal display device according to a second embodiment of the invention.
Figure 14A:
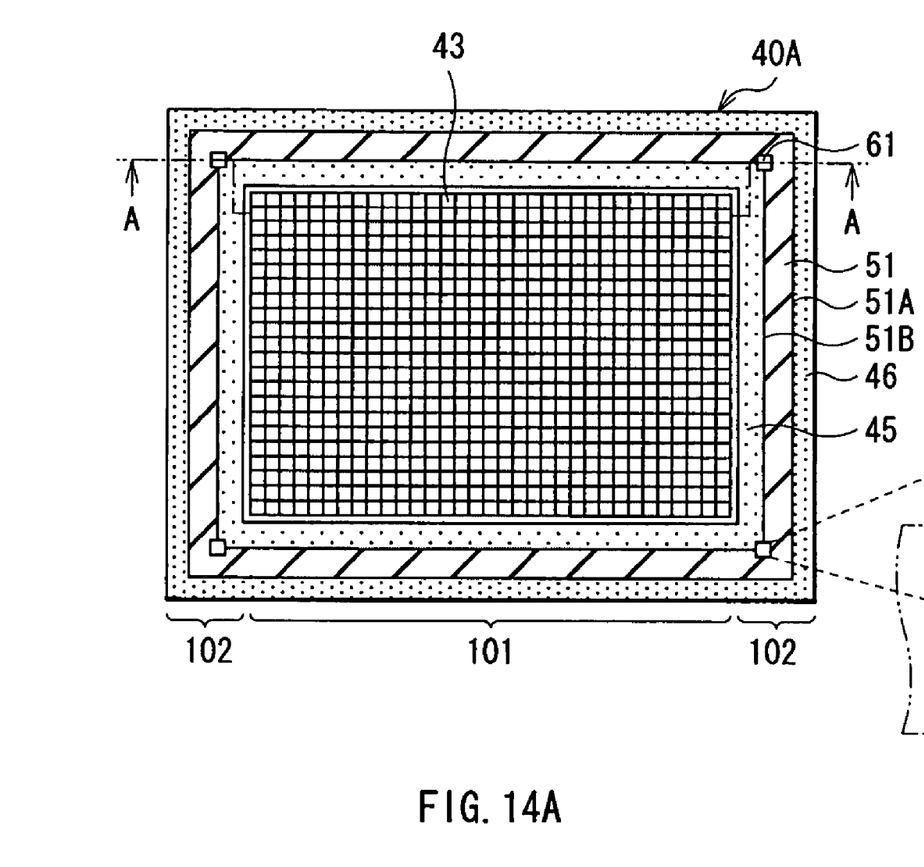
FIGS. 14A and 14B are plan views of the whole structure of the reflective liquid crystal display device according to the second embodiment of the invention.
Figure 14B:
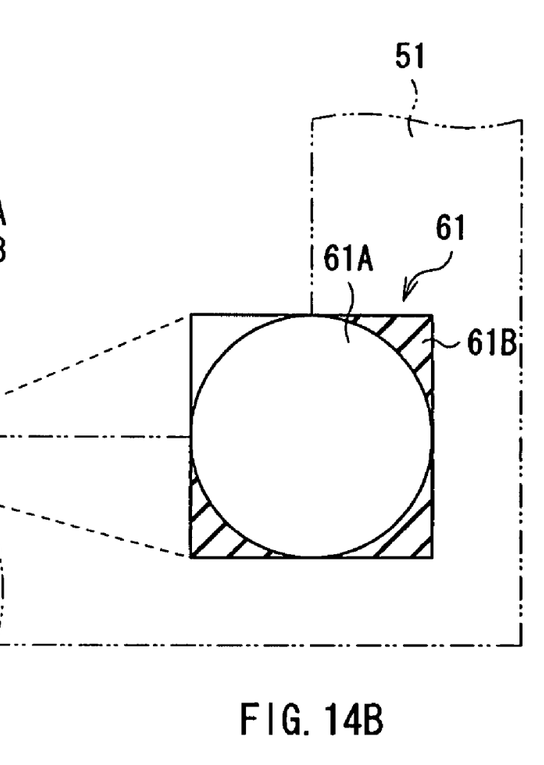

FIG. 13 shows the whole structure of a reflective liquid crystal display device according to the embodiment. FIG. 14A shows a plan view of the reflective liquid crystal display device. FIG. 13 corresponds to a sectional view taken along a line A-A of FIG. 14A. In FIG. 14A, the transparent electrode substrate 30 is not shown. The reflective liquid crystal display device comprises a pixel electrode substrate 40A including a common electrode 61. FIG. 14B shows an enlarged view of a common electrode 61. In the embodiment, "light-shielding electrode 45" and "common electrode 61" correspond to specific examples of "metal film" in the invention.

While the common electrode 61 is conducted to the transparent electrode 32 by the common material 62 as shown in FIG. 13, the common electrode 61 is formed in a region where a top layer of the pixel electrode substrate is removed so as not to be conducted to other electrodes on the pixel electrode substrate. However, in the case where the common electrode 61 and the light-shielding electrode 45 have the same potential, the light-shielding electrode 45 may have a function of the common electrode 61. Moreover, the common electrode 61 has a different shape from that of the pixel electrode 43, and because of that, a different electric field is applied to the common electrode 61, thereby the orientation characteristic of the liquid crystal 50 is affected. Therefore, as shown in FIG. 14A, the common electrode 61 is disposed in a position away from the pixel region 101. In FIG. 7A, the common electrode 61 is disposed in each of four corners; however, the number of the common electrodes 61 may be less than 4. Further, positions where the common electrodes 61 are disposed is not limited to four corners, and they may be formed in any other positions as long as they are disposed inside the seal portion 51.

In a structure of the related art (refer to FIG. 4), the common electrode 61 is formed outside the seal portion 51; however, in the structure according to the embodiment, all of the common electrode 61, the pixel electrodes 43 and the light-shielding electrode 45 are formed inside the outer surface 51A of the seal portion 51. In this case, all electrodes may be formed inside the inner surface 51B of the seal portion 51; however, as shown in FIG. 14B, a structure in which the common electrode 61 is partially (or entirely) coated with an end surface of the seal portion 51 may be applicable. In this case, a central portion 61A of the common electrode 61 is coated with a common material 62, and a peripheral portion 61B outside the central portion 61A is coated with the seal portion 51. Thus, in the structure in which the common electrode 61 is partially (or entirely) coated with the seal portion 51, as the seal portion 51, a seal material with high insulation is preferably used. No electrode is disposed outside the seal portion 51, that is, for example, the interlayer insulating film 46 is not coated. However, a structure in which the whole peripheral portion is coated with the seal portion 51 as shown in the structure example of FIG. 8 is also applicable.

As described above, in the reflective liquid crystal display device according to the embodiment, all electrodes including the common electrode 61 on the pixel electrode substrate are formed inside the outer surface 51A of the seal portion 51, so the peripheral portion 61B of the common electrode 61 which cannot be coated with the common material 62 in a structure of the related art can secure high moisture resistance. Thereby, in the case where the common electrode 61 is disposed on the pixel electrode substrate side, high moisture resistance can be achieved, and long-term reliability can be secured.

Modifications of First Embodiment and Second Embodiment

Modification of the first embodiment and the second embodiment relate to a moisture-resistant structure of a reflective liquid crystal display device including a liquid crystal inlet. In the following description, like components are denoted by like numerals as of the first embodiment and the second embodiment, and will not be further described.

Figure 15:
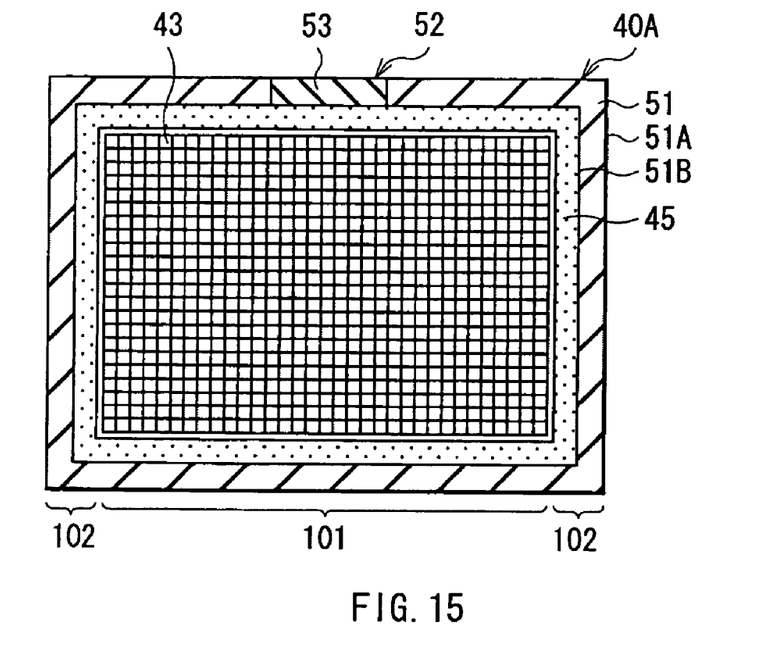
FIG. 15 is a plan view of a modification of the reflective liquid crystal display device according to the first embodiment of the invention.

FIG. 15 shows a modification of the reflective liquid crystal display device according to the first embodiment. In the reflective liquid crystal display device, a liquid crystal inlet 52 is disposed in a part of the seal portion 51, and the liquid crystal 50 is injected through the liquid crystal inlet 52. After that, the liquid crystal inlet 52 is sealed with a seal compound 53. The position where the liquid crystal inlet 52 is disposed is not limited to a position shown in FIG. 15. Moreover, a plurality of liquid crystal inlets 52 may be disposed. In the reflective liquid crystal display device, the liquid crystal inlet 52 is sealed so that the pixel electrodes 43 and the light-shielding electrode 45 are disposed inside the seal compound 53. In this case, the pixel electrodes 43 and the light-shielding electrode 45 may be formed inside the inner surface of the seal component 53, or may be partially coated with an end surface of the seal compound 53. In other words, in the modification, the pixel electrodes 43 and the light-shielding electrode 45 on the pixel electrode substrate are formed inside the outer surface 51A of the seal portion 51 and the outer surface of the seal compound 53.

Figure 16:
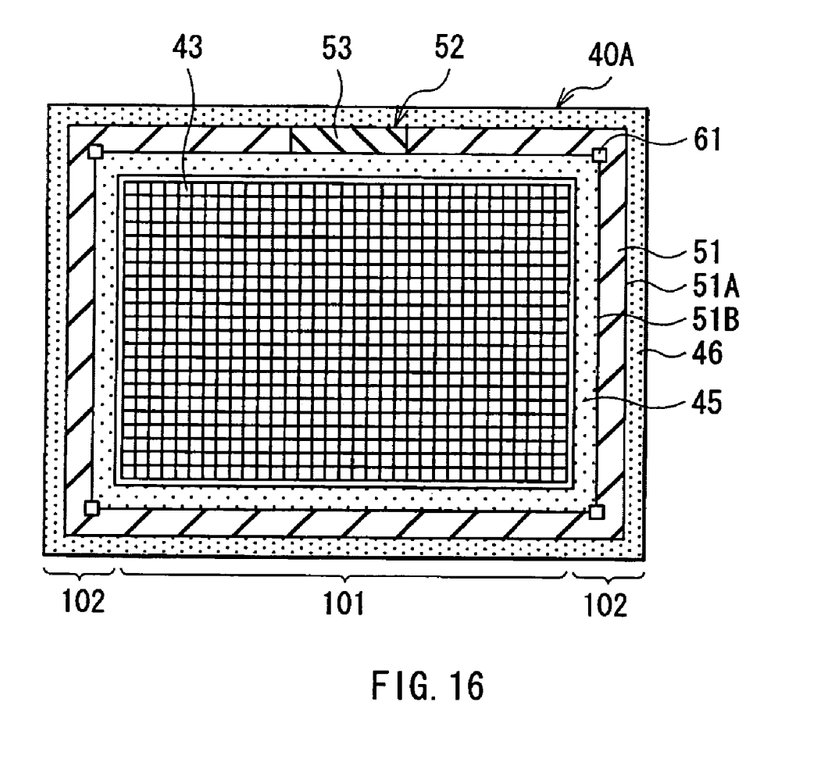
FIG. 16 is a sectional view of a modification of the reflective liquid crystal display device according to the second embodiment of the invention.

FIG. 16 shows a modification of the reflective liquid crystal display device according to the second embodiment. In the modification, as in the case of the modification shown in FIG. 15, the liquid crystal inlet 52 is disposed, and the liquid crystal inlet 52 is sealed with the seal compound 53 after injecting the liquid crystal. In the reflective liquid crystal display device, the liquid crystal inlet 52 is sealed so that all of the common electrode 61, the pixel electrodes 43 and the light-shielding electrode 45 are disposed inside the seal compound 53. In this case, each electrode may be formed inside the inner surface of the seal compound 53, or may be partially coated with the end surface of the seal compound 53. In other words, in the modification, all of the common electrode 61, the pixel electrodes 43 and the light-shielding electrode 45 on the pixel electrode substrate are formed inside the outer surface 51A of the seal portion 51 and the outer surface of the seal compound 53.

Thus, in the reflective liquid crystal display device according to the modifications, all electrodes on the pixel electrode substrate are formed inside the outer surface 51A of the seal portion 51 and the outer surface of the seal compound 53, so in the case where the reflective liquid crystal display device includes the liquid crystal inlet 52, high moisture resistance can be achieved, and long-term reliability can be secured.

Other Embodiments

The invention is not limited to the above embodiments and the above modifications, and can be variously modified. For example, in the above embodiments, the three-panel system projector is described as an example of the projector. However, the invention can be widely applied to any other system projectors such as a single panel system.

Moreover, in the above embodiments, the case where the light-shielding electrode 45 and the common electrode 61 are formed in the peripheral region 102 is described; however, the moisture-resistant structure according to an embodiment of the invention is applied to not only the light-shielding electrode 45 and the common electrode 61 but also a corrosible metal film which is formed on a pixel electrode substrate and is required to have moisture resistance. More specifically, in the case where a corrosible metal film which is exposed to air is disposed on the pixel electrode substrate, the metal film is formed inside the outer surface of the seal portion so as to secure moisture resistance.

Further, a combination of the moisture resistant structure according to the embodiments and the moisture resistant structure of the related art may be used. For example, in the structure example of FIG. 8, the surfaces of the pixel electrodes 43 and the light-shielding electrode 45 may be coated with an inorganic protective film made of, for example, silicon nitride. In the case where the pixel electrodes 43 are coated with the inorganic protective film, the inorganic protective film becomes a capacity component between the transparent electrode 32 and the pixel electrodes 43, and an electric field applied to the liquid crystal 50 may be reduced. In particular, in the case where the liquid crystal layer is thin, for example, as thin as approximately 3 μm or less, the effect of the inorganic protective film will be increased. However, in the reflective liquid crystal display device according to the embodiments, after sealing, the moisture resistance can be sufficiently secured by the seal portion 51, so the protective film may have the minimum thickness necessary for a manufacturing process (for example, 0.5 μm or less). Therefore, in the reflective liquid crystal display device according to the embodiments, in the case where a spacing between the pixel electrode substrate 40 and the transparent electrode substrate 30 is 3 μm or less, while the capacity component is minimized, the surfaces of the pixel electrodes 43 and the light-shielding electrode 45 can be coated with the inorganic protective film.

Further, a structure in which peripheral end surfaces of the whole device are coated with a coating material 152 with high moisture resistance as shown in FIGS. 6 and 7 may be used in combination.

It should be understood by those skilled in the art that various modifications, combinations, sub-combinations and alterations may occur depending on design requirements and other factors insofar as they are within the scope of the appended claims or the equivalents thereof.

What is claimed is:

1. A reflective liquid crystal display device, comprising:
   a pixel electrode substrate including reflective pixel electrodes disposed in matrix and a metal film formed outside a pixel region where the pixel electrodes are disposed;
   a transparent electrode substrate including a transparent electrode and facing the pixel electrode substrate with a predetermined spacing in between;
   a seal portion bonding the pixel electrode substrate and the transparent electrode substrate together with a predetermined spacing between facing substrate surfaces; and
   a liquid crystal sealed between the pixel electrode substrate and the transparent electrode substrate,
   wherein the pixel electrodes are formed interior to an inner surface of the seal portion and at least a portion of the metal film is formed interior to an inner surface of the seal portion on the pixel electrode substrate, and
   wherein the metal film contacts the seal portion, and the metal film includes at least a light shielding electrode and the metal film further includes a common electrode for applying a voltage to the transparent electrode, and the common electrode and the light shielding electrode are electrically isolated.

2. A reflective liquid crystal display device according to claim 1, wherein the metal film is partially coated with an end surface of the seal portion.

3. A reflective liquid crystal display device according to claim 1, further comprising:
   at least one liquid crystal inlet disposed in a part of the seal portion; and
   a seal compound for sealing the liquid crystal inlet,
   wherein the pixel electrodes and the metal film are formed inside the seal portion and an outer surface of the seal compound.

4. A reflective liquid crystal display device according to claim 1, wherein a spacing between the pixel electrode substrate and the transparent electrode substrate is 3 μm or less.

5. A liquid crystal display unit, comprising:
   a reflective liquid crystal display device,
   wherein the liquid crystal display unit displays an image through using light modulated by the reflective liquid crystal display device,
   the reflective liquid crystal display device includes:
   a pixel electrode substrate including reflective pixel electrodes disposed in matrix and a metal film formed outside a pixel region where the pixel electrodes are disposed;
   a transparent electrode substrate including a transparent electrode and facing the pixel electrode substrate with a predetermined spacing in between;
   a seal portion bonding the pixel electrode substrate and the transparent electrode substrate together with a predetermined spacing between facing substrate surfaces; and
   a liquid crystal sealed between the pixel electrode substrate and the transparent electrode substrate,
   the pixel electrodes are formed interior to an inner surface of the seal portion and at least a portion of the metal film is formed interior to an inner surface of the seal portion on the pixel electrode substrate, and
   the metal film contacts the seal portion, and the metal film includes at least a light shielding electrode and the metal film further includes a common electrode for applying a voltage to the transparent electrode, and the common electrode and the light shielding electrode are electrically isolated.

6. A liquid crystal display unit according to claim 5, further comprising:
   a light source; and
   a projection section projecting light emitted from the light source and modulated by the reflective liquid crystal display device to a screen,
   wherein the liquid crystal display unit is used as a reflective liquid crystal projector.

7. A reflective liquid crystal display device according to claim 1, wherein the light shielding electrode prevents an entry of light into a drive circuit.

8. A reflective liquid crystal display device according to claim 7, wherein said drive circuit is disposed interior to the seal portion.

9. A liquid crystal display unit according to claim 5, wherein the light shielding electrode prevents an entry of light into a drive circuit.

10. A liquid crystal display unit according to claim 9, wherein said drive circuit is disposed interior to the seal portion.

* * * * *